United States Patent
Waffner

(10) Patent No.: US 10,879,734 B2
(45) Date of Patent: Dec. 29, 2020

(54) ARRANGEMENT IN A SYSTEM FOR ELECTRICAL POWER PRODUCTION

(71) Applicant: Jürgen Waffner, Essen (DE)

(72) Inventor: Jürgen Waffner, Essen (DE)

(73) Assignee: Conjoule GmbH, Essen (DE)

(*) Notice: Subject to any disclaimer, the term of this patent is extended or adjusted under 35 U.S.C. 154(b) by 0 days.

(21) Appl. No.: 16/353,845

(22) Filed: Mar. 14, 2019

(65) Prior Publication Data
US 2019/0214848 A1 Jul. 11, 2019

Related U.S. Application Data

(63) Continuation of application No. PCT/EP2016/071715, filed on Sep. 14, 2016.

(51) Int. Cl.
| | |
|---|---|
| *H02J 13/00* | (2006.01) |
| *H02J 3/38* | (2006.01) |
| *G05B 15/02* | (2006.01) |
| *H04L 29/08* | (2006.01) |
| *H02J 3/00* | (2006.01) |

(52) U.S. Cl.
CPC .......... *H02J 13/0017* (2013.01); *G05B 15/02* (2013.01); *H02J 3/381* (2013.01); *H02J 3/383* (2013.01); *H04L 67/104* (2013.01); *H02J 3/003* (2020.01); *Y02E 10/56* (2013.01)

(58) Field of Classification Search
CPC ........ H02J 13/0017; H02J 3/383; H02J 3/381; H02J 3/003; H04L 67/104; G05B 15/02; Y02E 10/563
See application file for complete search history.

(56) References Cited

U.S. PATENT DOCUMENTS

| | | | |
|---|---|---|---|
| 9,535,474 B2* | 1/2017 | Kubota | H02J 3/14 |
| 2009/0076661 A1* | 3/2009 | Pearson | H01M 8/04626 700/291 |
| 2011/0276269 A1* | 11/2011 | Hummel | H02J 3/383 702/3 |
| 2014/0163755 A1* | 6/2014 | Potter | H02J 3/383 700/287 |
| 2016/0221453 A1* | 8/2016 | Bridges | B60L 53/65 |
| 2019/0037012 A1* | 1/2019 | Stocker | B29C 64/386 |
| 2019/0089716 A1* | 3/2019 | Stocker | H04L 67/1095 |
| 2019/0122443 A1* | 4/2019 | Stocker | H04L 67/104 |

(Continued)

FOREIGN PATENT DOCUMENTS

EP 2 830 184 A1 1/2015

*Primary Examiner* — Ramesh B Patel
(74) *Attorney, Agent, or Firm* — Reinhart Boerner Van Deuren P.C.

(57) ABSTRACT

A system having at least one controllable producer configured to produce at least one first energy amount, at least one non-controllable producer configured to produce at least one second energy amount in which the non-controllable producer is assigned to the controllable producer to form an electrical producer arrangement. The at least one second energy amount to be produced by the non-controllable producer is forecasted during at least one future time period, and the controllable producer is controlled based on the at least one forecasted second energy amount such that total energy amount supplied by the electrical producer arrangement to an electrical network during the future time period corresponds to a predefinable total energy amount.

14 Claims, 5 Drawing Sheets

(56) References Cited

U.S. PATENT DOCUMENTS

2019/0149429 A1* 5/2019 Stocker .............. H04L 12/4625
709/225
2019/0190987 A1* 6/2019 Waffner ................. H04L 67/12

* cited by examiner

ARRANGEMENT IN A SYSTEM FOR ELECTRICAL POWER PRODUCTION

CROSS-REFERENCE TO RELATED PATENT APPLICATION

This patent application is a continuation of PCT/EP2016/071715, filed Sep. 14, 2016, the entire teachings and disclosure of which are incorporated herein by reference thereto.

FIELD

The invention relates to a system comprising at least one controllable producer configured to produce at least one first energy amount and at least one non-controllable producer configured to produce at least one second energy amount. The invention relates also to a method for operating a system, an electrical producer arrangement and a peer-to-peer application.

BACKGROUND

An electrical system comprises an (public) electrical grid, a plurality of electrical producers and a plurality of electrical consumers and consumer sets, respectively. The different producers can be technically divided into two categories: controllable producers and non-controllable producers. Controllable producers include, in particular, power plants, such as coal-fired power plants, nuclear power plants or gas power plants. "Controllable" means that the production of power can be controlled by controlling the inflow of a source medium (e.g. coal, gas, etc.) used to produce the electrical power and energy amount, respectively.

Examples of non-controllable producers include wind power stations and photovoltaic devices. Thereby, in the present application "non-controllable" means that the production of power cannot be controlled. This means that the production of power depends on non-controllable parameters, in particular, meteorological parameters. In other words, the source medium (e.g. sun, wind), in particular, an inflow of the source medium, which is used to produce the electrical power and energy amount, respectively, is not controllable. The supply of produced electrical power may be controllable. For instance, a non-controllable producer may be equipped with a remote control box configured to control the supply of power to the electrical network. Nevertheless, the producer is presently regarded as a non-controllable producer due to the non-controllable inflow of the source medium which is used to produce the electrical power and energy amount.

Furthermore, a steady concern of operating electrical networks is to balance supply and demand of electrical power. In order to operate an electrical network in a stable manner the supply of electrical energy to the electrical network must always correspond to the output of electrical energy from the electrical network. Technically speaking the grid frequency must be always within predefined upper and lower limits.

However, the increasing number of non-controllable producers makes it more and more difficult to operate an electrical network in a stable manner. For instance, photovoltaic devices e.g. arranged on roofs of entities, such as buildings, comprise the drawback that electrical power is fed into the electrical network in a non-controlled manner. The produced power depends on current meteorological parameters of the location of the photovoltaic device. In simple terms, if the sun is currently shining power is produced and fed into the electrical network. If the sun is currently not shining (e.g. due to a cloud) the power production is reduced, and thus, the power fed into the electrical network is reduced.

According to prior art it is know that, in order to operate a network in a stable manner, grid parameters, in particular, the grid frequency can be monitored. Based on the current grid frequency and e.g. based on weather forecasts, the one or more controllable producers are controlled such that fluctuations in the network can be compensated. Nevertheless, critical network states still occur again and again. Thereby, the issue will increase due to the steady increase of non-controllable producers.

Therefore, an object of the present application is to provide a system which enables at least to reduce critical network states in a simple manner.

BRIEF SUMMARY

The above object is solved according to a first aspect of the present invention by a system according to the present disclosure. The system comprises at least one controllable producer configured to produce at least one first energy amount. The system comprises at least one non-controllable producer configured to produce at least one second energy amount. The non-controllable producer is assigned to the controllable producer to form an electrical producer arrangement. The system comprises at least one first forecasting means configured to forecast the at least one second energy amount to be produced by the non-controllable producer during at least one future time period. The system comprises at least one controlling means configured to control the controllable producer based on the at least one forecasted second energy amount such that total energy amount supplied by the electrical producer arrangement to an electrical network during the future time period corresponds to a predefinable total energy amount.

In contrast to prior art, controllable and non-controllable producers are (fixedly) grouped together in order to form an electrical producer arrangement. Such an electrical producer arrangement has the technical effect of a virtual battery. A controllable producer may indirectly (or virtually) store the energy amount produced by the non-controllable producer. The total supply of electrical power into the network by the electrical producer arrangement can be controlled with high accuracy. The number of critical network states can be at least reduced.

The system can be connected to a (public) electrical network or grid comprising a plurality of power lines. In particular, consumer sets, electrical producers, etc. can be connectable to the electrical network.

The present system comprises one or more controllable producer(s). Each controllable producer may be capable to produce a first energy amount in accordance with a control parameter data set, such as a control instruction data set.

Furthermore, the system comprises one or more non-controllable producers. Each of these producers may be capable to produce a second energy amount in accordance with the availability of a source medium (e.g. sun, wind, etc.) used for producing a second energy amount.

The at least one non-controllable producer is assigned to at least one controllable producer. In particular, one or more non-controllable producer(s) is/are fixedly assigned to one or more controllable producer(s) in order to form an electrical producer arrangement having, in particular, the effect of a virtual battery. Assigning means, in particular, that the at least one non-controllable producer is (virtually) grouped or combined with the at least one controllable producer.

Furthermore, the system comprises at least one first forecasting means. The first forecasting means may be configured to forecast the at least one second energy amount produced by the at least one non-controllable producer. If there are two or more non-controllable producers assigned to the at least one controllable producer the at least one first forecasting means may be at least configured to forecast the total second energy amount e.g. based on the two or more forecasted individual second energy amounts to be produced by respective non-controllable producers. It is also possible that a plurality of first forecasting means can be provided.

For instance, the first forecasting means may forecast the at least one second energy amount for one or more (specific) future time period(s) (e.g. next week, next day, next x hours, next x minutes, etc.) based e.g. on historical energy amount production data, meteorological forecast data and/or performance parameter data regarding the performance of the non-controllable producer.

The forecasted second energy amount can be provided to a controlling means. The at least one controlling means may have an interface to the first forecasting means and/or first forecasting means and controlling means may be formed by a single module.

The at least one controlling means may be configured to control the controllable producer(s). In particular, the first energy amount produced by the controllable producer can be controlled through the controlling means. Thereby, the controlling means takes at least the forecasted second energy amount into account. More particularly, in order to avoid or at least reduce critical network states, a desired total energy amount to be supplied from the non-controllable producer(s) and controllable producer(s) of the electrical producer arrangement can be given (e.g. by a network operator). The controlling means may control the energy amount produced by the at least one controllable producer at least based on the forecasted (total) second energy amount of the one or more non-controllable producer(s) and the given total energy amount to be supplied during said future time period. In particular, the controlling means may determine, e.g. calculate, the difference between the given total energy amount and the forecasted second energy amount. Then the controlling means may control the at least one controllable producer such that it produces (and supplies) the calculated difference in order to achieve that the total energy amount supplied to the electrical network during said future time period corresponds to the predefinable total energy amount.

A forecasting means and/or a controlling means may be a software and/or hardware module. It shall be understood that producing an energy amount and power, respectively, means a conversion of a first kind of energy to an electrical energy. It shall be further understood that all energy amounts (E) may depend on the time (E=f(t)).

According to a preferred embodiment, the one or more controllable producers may be producers which use gas (e.g. natural gas, bio gas, etc.) and the one or more non-controllable producers may be photovoltaic device(s) e.g. provided by an entity, such as a building. In particular, a plurality of photovoltaic devices may be assigned to one producer which uses gas. The effect of the resulting electrical producer arrangement can be described as a photovoltaic storage arrangement.

According to a preferred embodiment, at least one prosumer (producer and consumer) entity comprising the at least one non-controllable producer and at least one consumer set can be assigned to a controllable producer in order to set-up an electrical producer arrangement.

According to a further embodiment of a system according to the present application, the electrical producer arrangement may comprise at least one second forecasting means configured to forecast at least one third energy amount to be consumed by at least one consumer set of the electrical arrangement. The controlling means may be configured to control the controllable producer based on the at least one forecasted second energy amount and the at least one forecasted third energy amount such that total energy amount supplied by the electrical producer arrangement to the electrical network during the future time period corresponds to a predefinable total energy amount. A consumer set may comprise one or more electrical loads. Non-exhaustive examples of electrical loads are refrigerators, stoves, lighting appliance, computers, displays, television sets, cleaning devices, electrical heating devices, etc. For instance, a first non-controllable producer and a first consumer set may be arranged at/in the same entity (e.g. building and/or property). In such a case, usually, the second energy amount produced by the first non-controllable producer is primarily used for supplying the consumer set of the entity. From this follows that the second energy amount actually supplyable to the network may be smaller than the actually produced second energy amount. According to the present application, a self-consumption in form of the at least one third energy amount can be taken into account by the controlling means. The second forecasting means can be a separate module or the first and second forecasting means can be formed by a combined module. For instance, a (combined) forecasting means and module, respectively, may forecast an energy amount to be supplied by an entity during the future time period based on the second energy amount and the third energy amount.

It is particular advantageous if an electrical producer arrangement comprises (only) producers which are arranged in geographical proximity to each other. Due to the geographical proximity the number of critical network states can be further reduced since local unbalances can be reduced. In particular, according to a further embodiment of the application, the assignment of the at least one non-controllable producer to the at least one controllable producer may depend at least on the distance between the non-controllable producer and the controllable producer. Further criteria may be performance parameter of the non-controllable producer(s) and/or the controllable producer(s), already assigned non-controllable producer(s) and/or controllable producer(s), and the like. According to a particular preferred embodiment of the system according to the present application, a non-controllable producer may be only assignable to the controllable producer if the distance between non-controllable producer and the controllable producer is below at least one predefined distance threshold. The predefined distance threshold may be preferably 50 km, in particular preferably 10 km. In other words, if the distance of the at least one non-controllable producer to the controllable producer is below the predefined, the non-controllable producer may be assigned to the controllable producer in order to form an electrical producer arrangement. If the distance is greater the non-controllable producer may be not assigned to said controllable producer.

Preferably, the system may comprise two or more electrical producer arrangements. Each of the electrical producer arrangements may comprise one or more non-controllable producers and at least one controllable producer wherein each of the non-controllable producers may have a distance to the respective at least one controllable producer below a predefined distance threshold. By providing two or more locally grouped electrical producer arrangements the local stability of the electrical network, and thus, the global stability of the electrical network can be further improved in a simple manner.

Generally, a controlling means or a forecasting means may be formed by conventional technique and/or device. For instance, a client server structure can be provided in order to realize said means and the communication with the non-controllable producer and/or controllable producer. For instance, one or more server(s) can control and manage one or more electrical producer arrangements. The server may provide the controlling means and/or the at least one forecasting means. Further, the server can be used to manage electrical producer arrangement(s) including the forming of an electrical producer arrangement by controlling the assignment process.

However, a drawback of such a system is the server-client structure. In particular, the issue of using the server (or platform), apart from the high transaction costs, is that the central instance or central server has to manage confidential data including e.g. production and performance data of the provider of the non-controllable user, accounting data, etc. A persistent problem affecting the central instance is that of protecting the confidential data stored on one or more server(s) from access by unauthorized third parties. In particular, a high degree of security expenditure is required, in order to prevent said data from being tampered with. This in turn leads to even higher transaction costs. A further disadvantage is the complex and costly infrastructure for providing the described server-client structure and for managing and forming electrical producer arrangements.

According to a particular preferred embodiment of the system according to the present application, the electrical producer arrangement may comprise at least one peer-to-peer network with at least one peer-to-peer application executable by at least a part of the nodes of the peer-to-peer network. The peer-to-peer application may comprise at least one of:

the controlling means,
the first forecasting means, and
the second forecasting means.

At least a controlling process can be conducted in a more efficient and more secure way by monitoring and controlling said controlling process in that the controlling means are executed by at least a part (e.g. two or more) of the nodes of a peer-to-peer network. In other words, the controlling process and/or a forecasting process and/or a forming (assigning) process can be managed and controlled without a central instance but by a peer-to-peer application of a peer-to-peer network. By the fact that instead of a central server or a platform, a peer-to-peer network (also called a framework) undertakes the, in particular, tamper-proof controlling of one or more of these processes, by means of a peer-to-peer application, high security standards are achieved in that all computers (peer nodes or simply nodes) in the peer-to-peer network, at least a part of the nodes in the peer-to-peer network, at least monitor(s) said process(es), in particular, by executing one or more of the above means. Thereby, the transaction costs can be significantly reduced. No central, superior platform, server, cloud, etc. is required. The complexity of managing and controlling process(es) can be significantly reduced. User data and other confidential data can be securely managed.

In comparison to a client server system in which a server provides a service (controlling process) and a client uses the service, these roles are cancelled in the present peer-to-peer network. Each participant (e.g. node) of the peer-to-peer network can use a service and the like and offer such a service. In particular, a peer-to-peer network is self-determined and/or self-organized (without any higher-level units). In the present case preferably each node and computer, respectively, of the peer-to-peer network comprises the (same) peer-to-peer application.

A means, such as a controlling means, a first forecasting means and/or a second forecasting means, may be at least part of a so called "smart contract". A smart contract comprises code which may be executed by at least a part of the nodes (>2) of the peer-to-peer network. Since a part of the nodes (and not only one node) executes at least part of the controlling means, first forecasting means and/or second forecasting means or at least monitor the correct execution of the respective means, a high level of security can be provided.

According to a further preferred embodiment of the present application, the electrical producer arrangement may comprise at least one first peer-to-peer module assigned to the controllable producer. The controlling means (of the peer-to-peer application) may be configured to control the controllable producer by providing at least one control instruction data set to the first peer-to-peer module assigned to the controllable producer.

In particular, in order to communicate with the peer-to-peer application at least one first peer-to-peer module can be provided. A first peer-to-peer module may be uniquely assigned to a controllable producer. For instance, each controllable producer can comprise a first peer-to-peer module. Preferably, the peer-to peer module can be integrated in the controllable producer.

It is also possible that a communication connection is provided between the non-controllable producer and a (remotely arranged) first peer-to-peer module assigned to said controllable producer. This means that the peer-to-peer module can at least communicate and/or act on behalf of the controllable producer. For example, the peer-to-peer module can be partly formed by a separate processing device, such as mobile communication device (e.g. mobile phone, mobile computer, etc.), or it can run on a remote stationary processing device (e.g. in a data center). In case of a mobile communication device or a remote processing device the at least one controllable producer may have a secure communication channel to the processing device (or mobile communication device) of the data center and the processing device itself may have a connection to the first peer-to-peer network. In an embodiment the remote processing device may be a "gateway" to the peer-to-peer network. This means that the controllable producer can securely communicate via its first peer-to-peer module and the gateway to the peer-to-peer network.

The first peer-to-peer module may be configured to communicate, e.g. send/receive messages to/from the peer-to-peer application. The first peer-to-peer module may be a peer and node, respectively, of the peer-to-peer network. The first peer-to-peer module may be configured to receive at least a least one control instruction data set from the peer-to-peer application. For instance, the first peer-to-peer module may receive one or more message(s) and/or may be allowed to read out data intended for said first peer-to-peer module (e.g. due to a respective identifier of the first peer-to-peer module). The control instruction data set comprising e.g. one or more set power values configured to control/limit the power output of the controllable producer to said set values may be generated by the controlling means based on the forecasted second energy amount(s) and/or third energy amount(s), the predefinable total energy amount to be supplied, etc. (as explained hereinbefore).

The first peer-to-peer module may comprise a data connection to a controlling module of the controllable producer. The controlling module (e.g. comprising a processor) may be capable to analyze the received control instruction data set and may be configured to control the controller producer such that a first electrical energy amount is produced (and supplied to the network) in accordance with the received control instruction data set.

In addition, the first peer-to-peer module may provide data, such as (current) status data (e.g. currently produced electrical power, error state(s), maintaining state(s), etc.) to the peer-to-peer application e.g. for further processing.

According to a further embodiment of the system according to the present application, the electrical producer arrangement may comprise at least one further peer-to-peer module assigned to the non-controllable producer. The further peer-to-peer module may be configured to provide at least one data set to the peer-to-peer application. The data set may comprise at least one of:
the forecasted second energy amount,
at least one local meteorological parameter,
at least one performance parameter regarding the performance of the non-controllable producer.

The further peer-to-peer module may be similarly formed as the first peer-to-peer module. For avoiding repetitions, it is therefore referred to the above explanations. The further peer-to-peer module may be integrated in the non-controllable producer or be a separate device having a secure communication channel with the non-controllable producer. For instance, the further peer-to-peer module may have a data interface with a processing module (including a processor) of the non-controllable producer.

In one embodiment, the first forecasting means may be arranged at or in the non-controllable producer. For instance, a computing device of the entity comprising the non-controllable producer may have a first forecasting means. In other words, the non-controllable producer (or its entity) can be capable of forecasting said second energy amount to be produced by said non-controllable producer. Alternatively or additionally, a data set with at least one local meteorological parameter relating to the installation location of the non-controllable producer can be provided by the further peer-to-peer-module to the peer-to-peer application. For instance, the non-controllable producer may comprise one or more meteorological measuring units configured to measure meteorological parameters, such as temperature, moisture content in the atmosphere, the amount of liquid precipitation over a set period of time, wind speed, pressure of the atmosphere and/or the like. The one or more local meteorological parameter(s) can be used by the first forecasting means for forecasting the second energy amount, in particular, with a higher precision.

Furthermore, one or more performance parameter regarding the performance of the non-controllable producer can be provided from the further peer-to-peer module to the peer-to-peer application. Non-exhaustive examples of performance parameters are maximum power output, maintenance time(s), operational error(s), set-up angles of photovoltaic elements, compass direction, i.e. orientation of the photovoltaic elements, environmental parameters, e.g. shading obstacles (e.g. buildings, trees, mountains, etc.), change(s) of the non-controllable producer and/or the like. The performance data may include historical and actual production data. Preferably, based on one or more performance parameters, weather forecast data and/or local meteorological parameter(s) of the non-controllable producer, the first forecasting means e.g. of the peer-to-peer application may forecast the second energy amount to be produced by the non-controllable producer.

Preferably, one or more data feed(s) can be provided by the peer-to-peer application (so called "smart oracles"). A data feed can provide further data, preferably weather forecast data from at least one further source (e.g. meteorological service provider entity).

Furthermore, according to an embodiment of the system according to the present application, the electrical producer arrangement may comprise at least one further peer-to-peer module assigned to the consumer set. The further peer-to-peer module may be configured to provide at least one data set to the peer-to-peer application. The data set may comprise at least one of:
the forecasted third energy amount,
actual third energy amount,
at least one performance parameter regarding the performance of the consumer set.

In one embodiment, the second forecasting means may be arranged at or in the non-controllable producer. For instance, a computing device of the entity comprising the consumer set (and e.g. a non-controllable producer) may have a second forecasting means (and a first forecasting means). In other words, the consumer set (or its entity) can be capable of forecasting said third energy amount to be consumed by said consumer set. In addition or alternatively, the actual third energy amount, in particular, historical and actually measured third energy amount(s) can be provided to the peer-to-peer application. Alternatively or additionally, at least one performance parameter regarding the performance of the consumer set can be transmitted from the further peer-to-peer module to the peer-to-peer application. Non-exhaustive examples of performance parameter regarding the performance of the consumer set are maximum consumable power, environmental parameters (e.g. temperature), operating errors of an electrical load, change of the consumer set (e.g. exchange or the like of a load), and/or the like.

Preferably, based on one or more performance parameters related to the consumer set, weather forecast data and/or actual third energy amount of the consumer set, the second forecasting means e.g. of the peer-to-peer application may forecast the third energy amount to be consumed by the consumer set. It shall be understood that alternatively or additionally, historical and statistical experiences about e.g. standard entities, e.g. standard households, can be used in order to forecast the energy consumption of such an entity.

If a consumer set and a non-controllable producer are arranged at or in the same entity (e.g. a building and/or household), the consumer set and the non-controllable producer may use the same further peer-to-peer module. In other words, the further peer-to-peer module can be assigned to the consumer set and a non-controllable producer and to the respective entity, respectively. For instance, the further peer-to-peer module can be integrated in a computing device of the entity (e.g. a smart home controller or the like).

The peer-to-peer application can be preferably configured to form and set-up, respectively, one or more electrical producer arrangement(s). Setting up an electrical producer arrangement may comprise, according to a particular preferred embodiment of the system of the present application that the peer-to-peer application may be configured to form an electrical producer arrangement by generating an assignment transaction agreement at least about the assignment of the non-controllable producer to the controllable producer.

In order to (fixedly) combine or group a non-controllable producer with a controllable producer the peer-to-peer application may be configured to generate an assignment transaction agreement in form of a smart contract. For instance, the controlling means can be a portion of a generated assignment transaction agreement.

The peer-to-peer application may be configured to store the generated assignment transaction agreement. The generation of the assignment transaction agreement can be caused or initiated by at least one peer-to-peer module, such as a first peer-to-peer module of a controllable producer or a further peer-to-peer module of the non-controllable producer and/or consumer set, for example, by transmitting a request message comprising at least one instruction on the generation of the assignment transaction agreement. The request message may be sent by the first peer-to-peer module in order to at least temporarily set-up an electrical producer arrangement.

In particular, a suitable code and, where necessary, at least one key (e.g. signature) for verifying the sender of a message (e.g. sending peer-to-peer module and/or assigned entity) and/or the authenticity of a message can be transmitted to the peer-to-peer application or written in the peer-to-peer application by the respective peer-to-peer module. The assignment transaction agreement may be generated between at least one controllable producer and one or more non-controllable producers. Preferably following a confirmation message from the (other) peer-to-peer module comprising a suitable instruction and, where necessary, at least one key (e.g. signature) for verifying the sender of the confirmation message, a corresponding assignment transaction agreement can be advantageously generated following a check by the peer-to-peer network of the peer-to-peer application. Expressed in simple terms, each non-controllable producer and/or controllable producers can search for one or a plurality of suitable partners by means of the peer-to-peer network or the peer-to-peer application and an assignment transaction agreement can be generated by means of the peer-to-peer application.

Preferably, the assignment transaction agreement can comprise details of the grouped producers and controlling algorithm(s) for enabling a controlling means to control the energy supply from the electrical producer arrangement to the network in accordance with the controlling algorithm(s). In particular, the controlling algorithm(s) may at least partly form the controlling means. According to a preferred embodiment, the generated assignment transaction agreement may comprise at least one of:

identifiers of the involved non-controllable producer(s) and/or controllable producer(s),
at least one performance parameter regarding the performance of the non-controllable producer,
at least one performance parameter regarding the performance of the controllable producer,
controlling algorithm(s) and/or forecasting algorithm(s) and/or assigning algorithm(s), and
at least one assignment transaction criterion.

An identifier may uniquely identify the respective element. All elements of an electrical producer arrangement may comprise a unique identifier stored in the assignment transaction agreement. Based on these identifier(s) and e.g. corresponding communication addresses data can be exchanged between the peer-to-peer application and the respective elements. Further, one or more of the previously described performance parameter(s) can be stored in the assignment transaction agreement. For instance, the controlling means can use said information and e.g. the stored controlling algorithm(s) to control the controllable producer, as described above, and/or the at least one forecasting means can use said information and e.g. the stored forecasting algorithm(s) in the forecasting process, as described above. Eventually, it may be possible that an assignment transaction criterion is defined in the assignment transaction agreement. For instance, an amount of cryptocurrency to be paid e.g. for one or assignment process(es), one or more controlling process(es), one or more forecasting process(es) or the like. The assignment transaction criterion may also be a predefinable distance threshold, as described above.

The generation of an assignment transaction agreement may include the generation of a controlling means and/or forecasting means.

Upon generating of such an assignment transaction agreement, the electrical producer arrangement can be controlled and managed in accordance with said assignment transaction agreement.

In a further preferred embodiment, an annual storage can be included in the assignment transaction agreement. In this annual storage, (power) fluctuations (difference value) between the forecasted second energy amount to be produced by a non-controllable producer (or e.g. the forecasted sum of a second and third energy amount of a prosumer entity) and the actual measured second energy amount produced by a non-controllable producer (or e.g. the actual measured sum of a second and third energy amount of a prosumer entity) can be stored. At the end of a predefined time period (e.g. after a year, month, etc.), based on the current difference value of the annual storage the difference value can be balanced e.g. by a respective cryptocurrency transaction (e.g. based on a further defined assignment transaction criterion) and/or by providing more power to e.g. the prosumer by the controllable producer.

Further, it is noted that if a first electrical producer arrangement is not able to produce the predefined total energy amount (e.g. if there is too low energy in the virtual battery) the electrical producer arrangement may contact a third party (preferably a further electrical producer arrangement) in order to initiate the production of the determined difference between the maximum total energy amount producible by the first electrical producer arrangement and the predefined total energy amount through the at least one further electrical producer arrangement.

In order to set-up an electrical producer arrangement including an extension of an electrical producer arrangement, it is preferred that each producer and consumer set and/or entity is previously registered in the peer-to-peer application or known in the peer-to-peer application as an registered peer in an external registration. According to a further embodiment of the system according to the present application, the peer-to-peer application may comprise at least one registration means configured to receive a registering message of a peer-to-peer module assigned to at least one element of the group comprising the non-controllable producer, the controllable producer and the consumer set. The registration means may be configured to register the element (i.e. the non-controllable producer, the controllable producer and/or the consumer set) by storing a unique identifier of the element (i.e. the non-controllable producer, the controllable producer and/or the consumer set) in the peer-to-peer application and/or a storage arrangement controlled by the peer-to-peer application.

The registration means of the peer-to-peer application may be configured to receive a registering message of a peer-to-peer module assigned to a controllable producer, non-controllable producer and/or consumer set. The registration means may be configured to register the controllable producer, non-controllable producer and/or consumer set by storing a unique (peer-to-peer) identifier. The identifier can be stored in an identifier list of the peer-to-peer application. Preferably, the identifier list can be stored in the peer-to-peer application and/or a storage arrangement controlled by the peer-to-peer application. The identifier list can be used for authorization processes e.g. prior to allowing the generation of an assignment transaction agreement or the like. For instance, in order to validate a sender of a message, each message can be provided with a signature of the sender. The signature can be checked by the peer-to-peer application by using the identifier list. For instance, only in the case the signature of the message corresponds to an identifier/signature stored in the identifier list, the message can be validated. Alternatively, the identification or "known as registered" can be conducted by a trusted registration entity which can set a check flag or the like in case of a positive identification.

More particularly, an entity including a user, device, unit, producer, consumer set or the like can be registered in the peer-to-peer application, as e.g. a so called smart asset. Each registered entity can be stored with its unique (peer-to-peer) identifier e.g. in one or more identifier list(s) of authorized entities. An identifier of an entity might be already a peer-to-peer identifier or another identifier suitable to uniquely identify the entity. The unique peer-to-peer identifier may be a serial number or a smart asset hash of e.g. the entity, the user's name of the entity, a communication address of an entity, a signature, etc. If e.g. an identifier of an entity is not already a unique peer-to-peer identifier, e.g. if the identifier is non-unique name of a user, the peer-to-peer application, in particular, the registering means, may be configured to generate a unique peer-to-peer identifier for the respective entity (according to preset rule(s)).

An entity can be a trusted platform module.

It shall be understood that an entity can be a user registered in the peer-to-peer application. Each registered user can be stored with or linked to its unique (peer-to-peer identifier) e.g. in one or more identifier list(s) of authorized entities. According to an embodiment of the system according to the present application, a user may authenticate himself at one of the peer-to-peer modules of the system.

Prior to the registration of an entity (e.g. producer, consumer set or entity in form of a building, etc.), at least part of the nodes (peers) of the peer-to-peer network may check, in particular, by executing the registration means, whether the registering requirements (such as specific entity specifications or valid signatures or compliance requirements) predefined by the peer-to-peer network are met by the entity/device requesting registration. For instance, it may be necessary that a controllable producer, non-controllable producer, consumer set and/or entity meets predefined technical specifications. In order to perform the check, preferably, further data may be included in the registering message. In particular, the peers of the peer-to-peer network may provide registering rules or registering requirements which must be fulfilled by an entity to be regarded as a trustful entity. Rules/requirements may be individually defined by the peers of a peer-to-peer network. E.g. it may be necessary that a new entity must be recommended by an entity which is already a participant of the peer-to-peer network. In addition, it may be necessary that this participant must have a reputation factor which increases a predefined minimum reputation factor. For instance, if a producer has a low reputation factor e.g. due to detected non-payment of (some) invoice(s), the producer and provider of the producer, respectively, may not be registered by the registration means. Further data may be technical data regarding the performance of a producer or consumer set and/or the location (e.g. GPS coordinates) of a producer or consumer set. Only if the requesting entity fulfills the technical requirements and/or location requirements of the peer-to-peer network (and/or a trusted external registration entity has set a check flag), the requesting entity may be registered in the peer-to-peer application.

According to a further preferred embodiment, the at least one peer-to-peer application can be a decentralized register or a shared database configured to store data, e.g. assignment transaction agreement(s), identifier(s), control instruction data set(s), etc., with given certain proofs or signatures. In addition to e.g. identifiers, the decentral register can store computer code acting as e.g. controlling means, first forecasting means, second forecasting means or registration means. In particular, the code can be invoked by a transaction to the address of the code in so called 'smart contracts'. This code can be processed on the plurality of node(s) of the peer-to-peer network.

In a further embodiment computer codes of an external computing device controlled by the peer-to-peer application may include algorithm(s) for de-central cognitive analytics or machine learning. Analytics and learning can be shared with other devices can be shared, aggregated and further analyzed via the peer-to-peer applications.

A decentralized register can be readable at least by a part of the participants of the peer-to-peer network. In particular, every computer node and each registered entity (by means of the respective peer-to-peer module) can comprise the peer-to-peer application. The decentralized register, at least the public part (i.e. may be without private contracts) may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. A message or transaction sent to a smart contract may start the execution of a code of the smart contract (e.g. registration means, controlling means, forecasting means etc.) while using data stored in the smart contract. For instance, sending forecasted second and/or third energy amount to a controlling means may start the execution of the code resulting in e.g. generating and transmitting control instruction data set, as described hereinbefore.

The peer-to-peer application can be built upon the following elements: peer-to-peer network comprising Consensus System and/or Protocol, Data Structure, Merkle Trees, Public Key Signatures, *Byzantine* Fault Tolerance. It may replicate data based on a consensus principle. It may be auditable and traceable.

In a simple way information can be made available to preferably all participants. This may allow to carry out a review of the information stored in the decentral register or the code executed in the decentral register. Particularly preferably, each computer (node) in the peer-to-peer network can be configured to review new information, in particular, based on older information stored in the peer-to-peer application. In addition, the at least one controlling means may be monitored by at least a part of the nodes of the peer-to-peer network, preferably by all nodes. A manipulation of a controlling means can thus be prevented, at least detected.

Moreover, at least a plurality of nodes, preferably each node can in each case comprise the complete data content, but include at least a portion of the data contents of the peer-to-peer application, in particular of the decentral register. For example, it may be provided that after a positive verification of written information or e.g. a positive registration in the peer-to-peer application this information is saved by all nodes, at least by a part of the computers. For instance, after the generation of an assignment transaction agreement and/or after a successful registration, the agreement and (new) identifier, respectively, can be stored at least by a part, preferably all nodes of the peer-to-peer network. The tamper resistance of the data stored in the peer-to-peer application can thereby be further improved. Each action can be securely controlled.

In order to store new information in a tamper-proof way, the peer-to-peer application can comprise encryption means and/or signature means and/or verification means, wherein at least one of the encryption means and/or signature means and/or verification means is configured to store data, such as an assignment transaction agreement (s), identifier(s), control instruction data set(s), forecasted energy amount(s), etc. In particular, it can be provided that by the hash function a link is established with at least one previously stored information in the decentral register. Further data, such as request messages, ordinary, contextual and/or transaction data of an entity, such as a provider entity, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present system, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, controllable and non-controllable producers can be networked together in order to form a virtual battery for improving the stability of an electrical network in a secure way. E.g. a controlling means can be easily implemented as a smart contract in a block chain. A system with two or more different electrical producer arrangement can be managed and controlled in an easy manner.

In addition, the block chain can be used to generate predefined action(s) caused by at least one peer-to-peer module and/or a controlling means in a tamper-proof manner. The block chain according to the present embodiment is particularly a decentralized, peer-to-peer-based register in which all data related to at least one controlling process can be logged. A block chain is particularly suitable as a technical means to replace a central entity/server in a simple and secure manner.

In further embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms such as side chains or smart contracts. A peer-to-peer node can run one or more different block chain client (s).

Data of the peer-to-peer application can be stored on the "decentral ledger technology" and/or the decentral ledger steers (encrypted) data storage arrangements accessible via the internet and preferably in de-central data storage arrangement, object store and database, respectively, such as Interplanetary File System (IPFS) or storj or in a distributed Blockchain database (e.g. BigChainDB). Access to encrypted data to third party entities is managed via the permission means formed as one or more smart contract(s) on the block chain.

In addition, data feeds can be provided by the peer-to-peer application (so called "smart oracles"). Data feeds can provide further data relating to a forecasting action from at least one further source. For instance, further weather forecast data and/or grid status data can be provided by a meteorological provider and/or a further grid status provider. Data can be captured from trusted sources off-chain and stored on the block chain or stored via the block chain on a decentral data storage entity.

Information among peer-nodes can be exchanged by a peer-to-peer messaging system. This means a peer node can send a message to another peer node to submit an information or to trigger an action. Messages can be clear text, signed, hashed, time-stamped and/or encrypted. This means that not all data exchanged among peer nodes must be stored on the block chain.

In a further embodiment, the at least one peer-to-peer network can be formed by a plurality of computer nodes and a peer-to-peer module, such as the first peer-to-peer module of a controllable producer, the further peer-to-peer module of a non-controllable producer, etc. A peer-to-peer module may be only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called "remote node") in order to communicate with the peer-to-peer network. This allows reducing the required processing power of the peer-to-peer module.

In one implementation of the peer-to-peer network, there can be only one validating peer or full node, e.g. only one node can be configured to perform a validation process, e.g. conducting a forecasting or controlling action, and one or more observing (or monitoring) nodes. An observing node can validate transactions to establish a trust level but does not validate all transactions which is done by the validating peer.

In a further embodiment, the peer-to-peer module is one of the nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, such as forecasting data, etc., via the API. The decentral application so called "Dapp" is at least configured to process and transmit said data.

Preferably, the data is signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Data and transactions stored on the block chain do not provide "transactional privacy". Transactions between pseudonyms may be (often) stored in clear text on the block chain. In some cases data stored on the block chain are encrypted and the keys may be handled via the block chain. Transactions between pseudonyms are stored in clear text on the block chain. Privacy preserving, secure transactions or execution of computer code can be achieved with cryptographic tools such as zero knowledge (zk) proofs or zk Succinct Non-interactive Arguments (e.g. zk-SNARK). Transactions or algorithms are separated into two parts: a smart contract on the block chain and a private contract. A privacy preserving protocol ensures the privacy of data and the correctness of code execution (e.g. SNARK verification) may be done via the smart contract on chain). The private contract computation can be done by a set of nodes, off-chain computers or done in measured launch environment or a secure hardware enclave for attestation and sealing that cannot be manipulated by other software code running on the devices. In an alternative embodiment secure Multi-Party-Computing (sMPC) systems can be used for transactional privacy. Examples for privacy preserving protocols and computation are HAWK and MIT Enigma.

With zero knowledge proof (zk Proofs) the parties can see that the algorithm is executed correctly in a private contract, but the input data are not disclosed to the party. In addition selective privacy can be achieved by sharing keys to decrypt transactions for reporting and auditing purposes.

To securely deploy code and or data into a device a trusted execution environment such as Intel SGX or TPM or Direct Anonymous Attestation module can be integrated with a peer-to-peer module.

Similarly, in a further embodiment a particularly large peer-to-peer network may be divided in two or more (physical or logical or dynamically virtual) clusters. In a corresponding peer-to-peer network, for example, a validation (of a subset of transactions) may only be carried out by the members of one cluster (a subset of nodes; e.g. sharding of a block chain to improve the scalability). In a further embodiment the peer-to-peer application can be formed using multiple block chains. These block chains are connected via frameworks such as sidechains or smart contracts.

A further aspect of the present invention is a method for operating a system, in particular, a previously described system. The system comprises at least one the electrical producer arrangement with at least one non-controllable producer assigned to at least one controllable producer. The method comprises:
forecasting at least one second energy amount to be produced by the non-controllable producer during a future time period, and
controlling the at least one controllable producer based on the at least one forecasted second energy amount such that a total energy amount supplied by the electrical producer arrangement to the electrical network during the future time period corresponds to a predefinable total energy amount.

Another aspect is an electrical producer arrangement. The electrical producer arrangement comprises at least one non-controllable producer assigned to at least one controllable producer, at least one first peer-to-peer module configured to communicate with at least one peer-to-peer application of at least one peer-to-peer network, wherein the first peer-to-peer module is assigned to the controllable producer and configured to receive at least one set power data set based on at least one forecasted second energy amount to be produced by the non-controllable producer during a future time period, wherein the controllable producer is controllable based on the received one set power data set such that a total energy amount supplied by the electrical producer arrangement to an electrical network during the future time period corresponds to a predefinable total energy amount.

A still further aspect of the application is a peer-to-peer application of a peer-to-peer network. The peer-to-peer application comprises at least one controlling means configured to control at least one controllable producer assigned to at least one non-controllable producer based on at least one forecasted second energy amount to be produced by the non-controllable producer during a future time period such that total energy amount supplied by an electrical producer arrangement to the electrical network during the future time period corresponds to a predefinable total energy amount, wherein the electrical producer arrangement comprises the at least one non-controllable producer assigned to the at least one controllable producer.

The peer-to-peer application can be used in an above described system. The peer-to-peer application can be used to manage and set-up one or more electrical produce arrangement.

The features of the methods, systems, modules, peer-to-peer applications, electrical producer arrangements and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION

Figure 1:
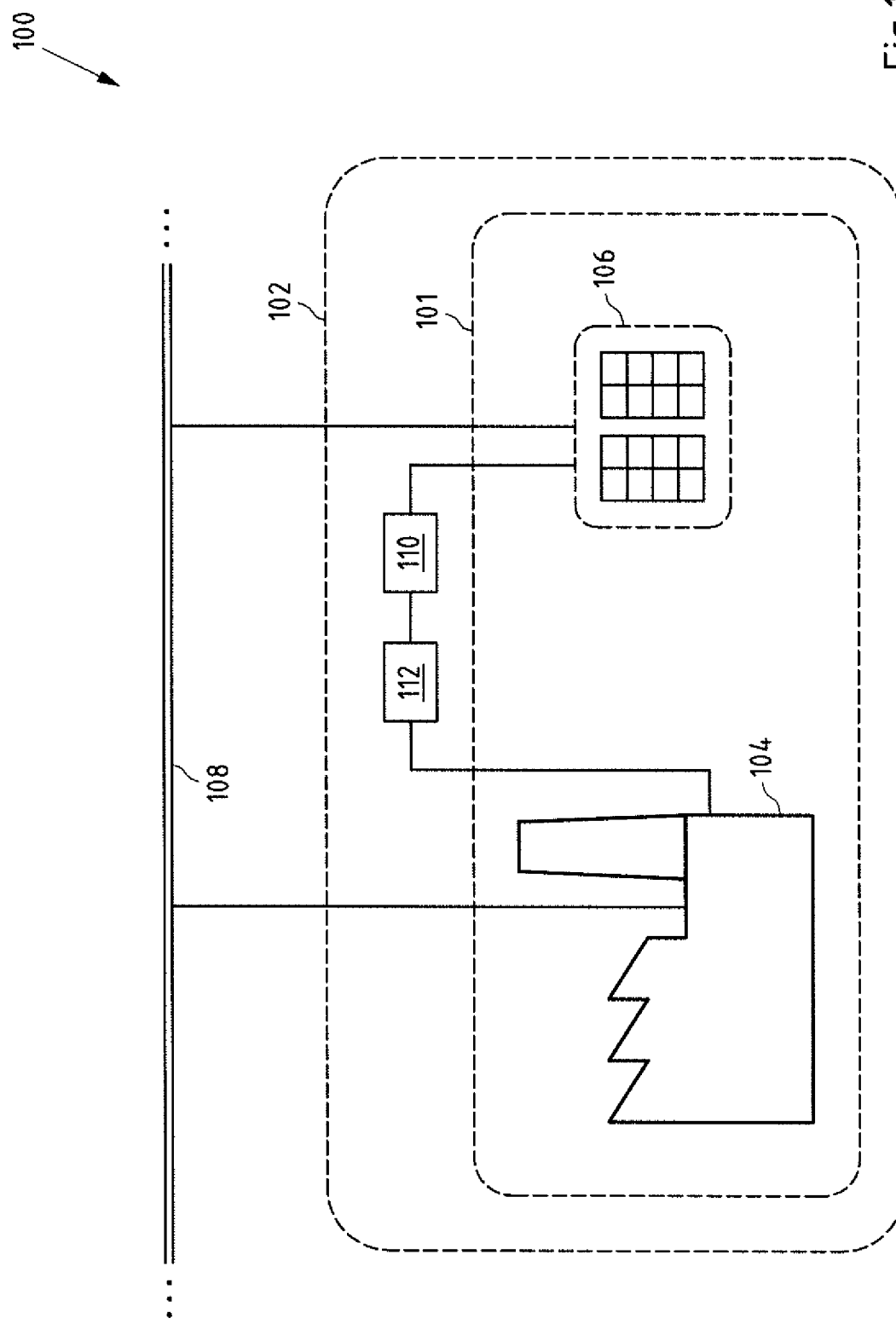
FIG. 1 shows a schematic view of an electrical system with an embodiment of a system according to the present invention.

Like reference numerals in different figures indicate like elements.

FIG. 1 shows a schematic view of an electrical system 100 with an embodiment of a system 102 according to the present application. The system 100 comprises an embodiment of an electrical producer arrangement 101 according to the present application.

As can be seen from figure, an electrical producer arrangement 101 is formed by (fixedly) assigning a non-controllable producer 106 to a controllable producer 104. In the present example, the non-controllable producer 106 is a photovoltaic device 106 comprising one or more photovoltaic elements. The controllable producer 104 is presently formed as a gas power plant 104 comprising one or more controllable gas turbine(s). Thereby, the source medium (amount of gas to be combusted) can be controlled in order to control the produced first energy amount.

Both producers 104, 106 are electrically connected with an electrical network 108, in particular, a power line 108. The electrical producer arrangement 101 can supply a total energy amount (e.g. the sum of the first energy amount and the second energy amount) to the electrical network 100.

Furthermore, the depicted system 102 comprises a controlling means 112 and a first forecasting means 110. The first forecasting means 110 is configured to forecast the second energy amount to be produced by the non-controllable producer 106 during at least one future time period. For instance, the first forecasting means 110 may evaluate weather forecast data, historical production data of the non-controllable producer 106 and/or at least one further performance parameter (e.g. max. producible power) of the non-controllable producer 106 in order to forecast said second energy amount e.g. for the next week, day, hour and/or the like.

The forecasted second energy amount can be provided to the controlling means 112. The controlling means 112 is configured to control the first energy amount to be produced during the future time period depending on the forecasted second energy amount. In particular, the controlling means 112 may determine, e.g. calculate, the first energy amount such that during the future time period a predefined total energy amount is supplied from the electrical producer arrangement 101 to the electrical network.

For instance, according to a simple case, the controlling means 112 can calculate the difference between the predefined total energy amount and the forecasted second energy amount (if the forecasted second energy amount is completely supplied to the network). Then, the calculated difference represents the first energy amount to be produced by the controllable producer 104 and, in particular, to be supplied by the controllable producer 104 to the network 108. It shall be understood that all energy amount values may be time variant values.

Then, the controlling means 112 may control the controllable producer 104, e.g. the one or more gas turbines, such that the controllable producer 104 supplies the determined difference energy amount to the network during said future time period. For instance, control instruction(s) comprising one or more set power values can be transmitted to the controllable producer 104, e.g. a controlling module of the one or more gas turbines.

Preferably, a peer-to-peer network comprising a peer-to-peer application can be used for realizing the controlling means 112 and/or the first forecasting means 110, as will described hereinafter. Alternatively or additionally, separate hardware devices can be used. It is also possible that the first forecasting means is implemented in the non-controllable producer and/or that the controlling means is implemented in the controllable producer.

Figure 2:
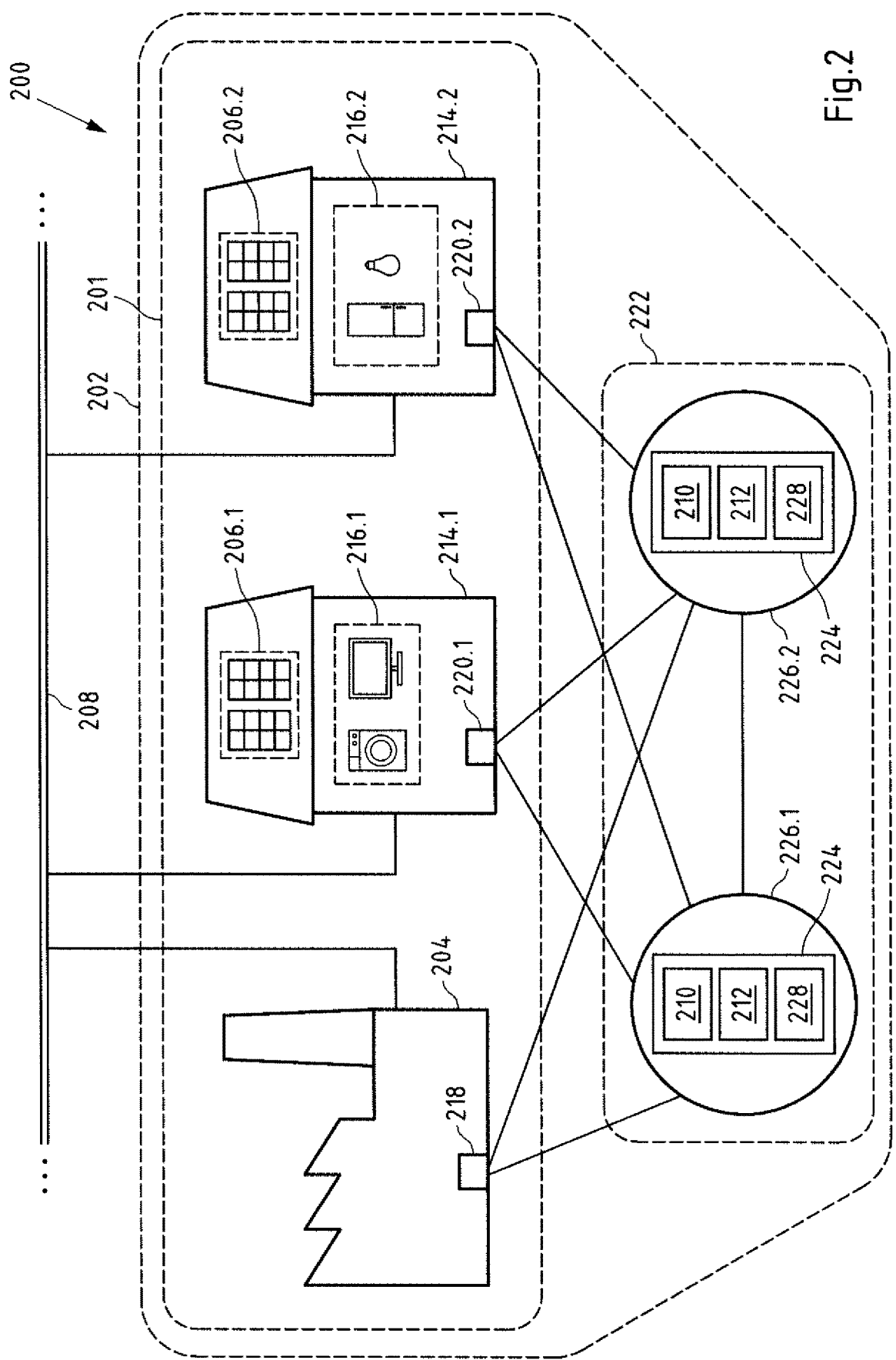
FIG. 2 shows a schematic view of an electrical system with a further embodiment of a system according to the present invention.

FIG. 2 shows a further embodiment of an electrical system 200 with an embodiment of a system 202 according to the present application. The system 202 comprises an electrical producer arrangement 201 and an exemplified peer-to-peer network 222.

The depicted electrical producer arrangement 201 comprises a controllable producer 204 (e.g. a gas power plant 204) and two non-controllable producers 206.1, 206.2 (e.g. photovoltaic devices 206.1, 206.2). Further, a first consumer set 216.1 comprising one or more electrical loads and a further consumer set 216.2 comprising one or more electrical loads are provided.

In the present example, the first non-controllable producer 206.1 and the first consumer set 216.1 are arranged within the (same) entity 214.1, such as a building 214.1. For instance, the non-controllable producer 206.1 can be arranged on the roof of the building 214.1 and the load(s) of the first consumer set 216.1 can be arranged within the entity 214.1, e.g. in the building 214.1 and/or on the associated property 214.1. In a similar manner, a further entity 214.2 (e.g. also a building 214.2) comprises the further non-controllable producer 206.2 and the further consumer set 216.2.

The entities 214.1, 214.2 (and the respective non-controllable consumers 206.1, 206.2 as well as the consumer sets 216.1, 216.2, respectively) are assigned to the controllable producer 204 in order to form the electrical producer arrangement 201. Preferably, the assignment is managed and controlled by a peer-to-peer network 222 and peer-to-peer application 224, respectively.

As can be seen from FIG. 2, according to the depicted preferred embodiment of the present invention, no central instance and/or third party organization is provided. In the present case, the system 200 comprises a peer-to-peer network 222 or a computer-computer network 222. The peer-to-peer network 222 comprises a plurality of nodes 226.1, 226.2 (only two are depicted for sake of clarity) and computers 226.1, 226.2, respectively. A peer-to-peer network 222 is characterized in the present case in that each node 226.1, 226.2 and/or participant 218, 220.1, 220.2 is preferably connectable at least to every other node 226.1, 226.2 and/or participant 218, 220.1, 220.2. For instance, at least one physical standard network (wired and/or wireless) can be used for connection. For communicating via the at least one physical standard network suitable transceiver modules may be arranged in the respective entities/devices.

In addition, the computers 226.1, 226.2 have equal rights, something which distinguishes them from a server-client structure.

The depicted nodes 226.1, 226.2 (each) comprise a peer-to-peer application 224. As can be seen from FIG. 2, the same peer-to-peer application 224 is preferably implemented on each node 226.1, 226.2. This means, in particular, that the same content is comprised on each node 226.1, 226.2 and that the same code (including different means 210, 212, 228) can be executed on each node 226.1, 226.2.

The peer-to-peer application 224 may preferably be a public register 224 that can, in particular, be inspected by all participants 226.1, 226.2, 218, 220.1, 220.2 (not only the nodes 226.1, 226.2) of the peer-to-peer network 222. Each of the nodes 226.1, 226.2 preferably has the (entire) public register 222. It may also be envisaged that only part of the register can be provided on a node (light node). In a particularly preferred embodiment, the peer-to-peer application 224 may be a block chain 224 which will be explained in more details hereinafter. It shall be understood that the peer-to-peer network may comprise further nodes. In addition, it shall be understood that also an observation device and/or an access entity can be formed as a node of the peer-to-peer network.

The peer-to-peer application 224 is configured to form a virtual electrical producer arrangement 201 comprising at least one controllable producer 204 and one or more non-controllable producer(s) 206.1, 206.2. The peer-to-peer application 224 may be configured to manage and control the power supply from the electrical producer arrangement 201 to the electrical network 208 (e.g. power line 208) by controlling the power supply of the controllable producer 204 through the controlling means 212, as will be described hereinafter.

Further, a first peer-to-peer module 218 assigned to the controllable producer 204 and two further peer-to-peer modules 220.1, 220.2 assigned to the first entity 214.1 and second entity 214.2, respectively, are provided. More particularly, the further peer-to-peer module 220.1 is assigned to the non-controllable producer 206.1 and the consumer set 216.1 and the other further peer-to-peer module 220.2 is assigned to the non-controllable producer 206.2 and the consumer set 216.2. In the present example, the first peer-to-peer module 218 is integrated in the controllable producer 204, the first further peer-to-peer module 220.1 is integrated in the first entity 214.1 and the second further peer-to-peer module 220.2 is integrated in the second entity 214.2.

A peer-to-peer module 218, 220.1, 220.2 is (generally) configured to communicate at least with the peer-to-peer network 222, i.e. the nodes 226.1, 226.2 of the peer-to-peer network 222. In other words, the first peer-to-peer module 218 or the controllable producer 204 corresponding or assigned to the respective peer-to-peer module 218 is at least a participant of the peer-to-peer network 222. The same applies for the two further peer-to-peer modules 220.1, 220.2. Preferably, all participants 226.1, 226.2, 218, 220.1, 220.2 (including all nodes) of the peer-to-peer network 222 are known to each participant 226.1, 226.2, 218, 220.1, 220.2 of the peer-to-peer network 222.

In the present case, all peer-to-peer modules 218, 220.1, 220.2 are not nodes of the peer-to-peer network 222 but only a participant 218, 220.1, 220.2. While 226.1, 226.2 or computers 226.2, 226.2 in the peer-to-peer network 222 comprise at least a part of the peer-to-peer application 224 itself, a participant of a peer-to-peer network 222, like the present peer-to-peer module 218, 220.1, 220.2, does not comprise the peer-to-peer application 224. Such a peer-to-peer module 218, 220.1, 220.2 is configured to provide (only) access to the peer-to-peer application 224 e.g. via an API (application programming interface). Each peer-to-peer module 218, 220.1, 220.2 (also a node or light node) may comprise a decentral application and at least an API.

In the case, the peer-to-peer module is formed as a node of the peer-to-peer network the peer-to-peer module (also) comprises at least partly the peer-to-peer application 224. It shall be understood that a peer-to-peer module 218, 220.1, 220.2 might be a node of the peer-to-peer network. It shall be understood that a peer-to-peer module 218, 220.1, 220.2 may have access or may be connected to a "gateway" running a node of the peer-to-peer network.

A further peer-to-peer module 220.1, 220.2, may be configured to transmit one or more data sets to the peer-to-peer application. The data sets may be needed by the first forecasting means 210 for forecasting the second energy amount and/or the second forecasting means 228 for forecasting the third energy amount. It shall be noted that the first and second forecasting modules 210, 228 can be formed by one forecasting means configured to forecast the total energy amount to be supplied from an entity 214.1, 214.2 during a future time period.

For instance, the first forecasting means 210 executed on the respective node 226.1, 226.2 may forecast the second energy amount producible by the first non-controllable producer 206.1 during a specific future time period. The second forecasting means 228 executed on the respective node 226.1, 226.2 may forecast a third energy amount to be consumed by the first consumer set 216.1 (self-consumption of the entity 214.1) during said specific future time period. Based on the forecasted second and third energy amounts a fourth energy amount to be supplied to the electrical grid 208 can be determined e.g. by the controlling means 212 or one of the forecasting means 210, 228.

In the same manner, the second, third and fourth energy amount of the further entity 214.2 can be determined. Then, the controlling means 212 may determine the difference between a desired and/or predefined total energy amount and the sum of the respective fourth energy amounts. The difference represents the first energy amount to be produced (and supplied) by the controllable producer 204 to the network 208.

In accordance with the determined difference, the controlling means 212 may at least initiate the provision of a control instruction data set to the controllable producer 204 such that the total energy amount supplied by the electrical producer arrangement 201 to the electrical network 208 corresponds to the predefined total energy amount. For instance, one or more messages can be sent by the peer-to-peer application to the first peer-to-peer module upon initiation by the controlling means 212. Alternatively or additionally, a respective control instruction data set associated with the identifier of the controllable producer 204 can be read by the controllable producer 204. Preferably, at least a part of the nodes 226.1, 226.2 (>2) of the peer-to-peer network 222 can at least monitor the execution and/or provision of data. Thereby, the manipulation risk can be significantly reduced.

Figure 3:
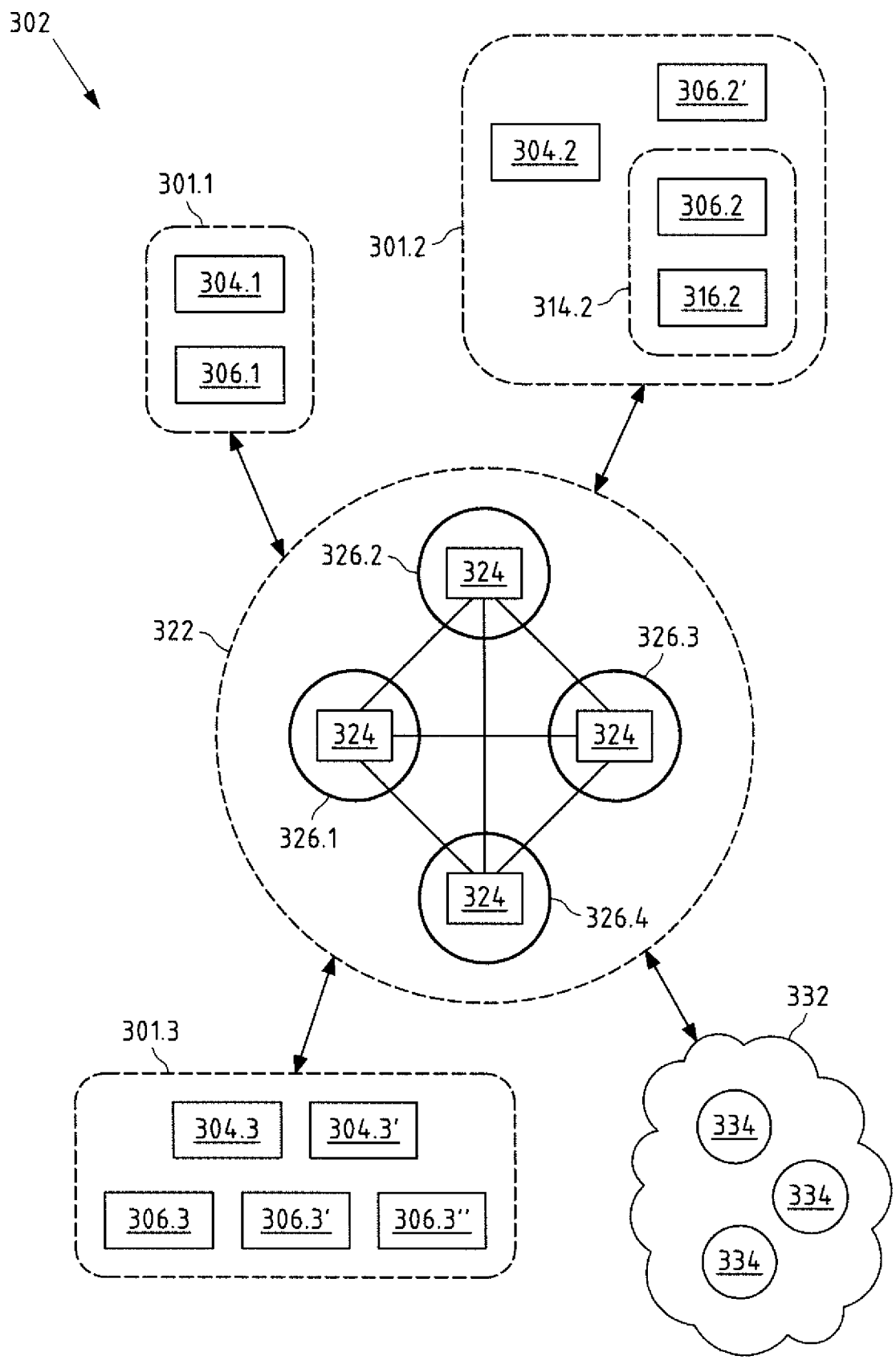
FIG. 3 shows a schematic view of a further embodiment of a system according to the present invention.

FIG. 3 shows a schematic view of a further embodiment of a system 302 according to the present application. For the sake of clarity, some details, such as the electrical grid and power lines, respectively, controlling and forecasting means, have been not depicted.

The system 302 comprises a plurality of electrical producer arrangements 301.1, 301.2, 301.3. In particular, a first electrical producer arrangement 301.1, a second electrical producer arrangement 301.2 and a third electrical producer arrangement 301.3 are provided. The first electrical producer arrangement 301.1 comprises a first non-controllable producer 306.1 assigned to a first controllable producer 306.1. Each of the producers 304.1, 306.1 may comprise a peer-to-peer module (not shown for sake of clarity) configured to communicate with the peer-to-peer application 324 and peer-to-peer network 322, respectively, e.g. as explained above.

The depicted second electrical producer arrangement 301.2 comprises a second controllable producer 304.2, a second entity 314.2 with a first second non-controllable producer 306.2 and a second consumer set 316.2, and a further second non-controllable producer 306.2'. The entity 314.2 and the producer 306.2' are assigned to said second controllable producer 304.2. Each of the producers 304.2, 306.2, 306.2 and consumer set 316.2 may comprise at least one assigned peer-to-peer module (not shown for sake of clarity) configured to communicate with the peer-to-peer application 324 and peer-to-peer network 322, respectively, e.g. as explained above.

Eventually, the third electrical producer arrangement 301.3 comprises two third controllable producers 304.3, 304.3' and three third non-controllable producers 306.3, 306.3', 306.3" assigned to said two third controllable producers 304.3, 304.3'. Each of the producers 304.3, 304.3', 306.3, 306.3', 306.3" may comprise a peer-to-peer module (not shown for sake of clarity) configured to communicate with the peer-to-peer application 324 and peer-to-peer network 322, respectively, e.g. as explained above.

The peer-to-peer application 324 may be configured to manage the formation of electrical producer arrangements 301.1, 301.2, 301.3 by managing and controlling the assignment of one or more non-controllable producer(s) to one or more controllable producer(s). For instance, as will be explained in more details hereinafter, the peer-to-peer application may be configured to form an electrical producer arrangement 301.1, 301.2, 301.3 by generating an assignment transaction agreement about the assignment of one or more non-controllable producer(s) to one or more controllable producer(s).

Each electrical producer arrangement 301.1, 301.2, 301.3 can comprise a unique electrical producer arrangement identifier. The electrical producer arrangement identifier can be stored together with the unique identifiers of all producers, consumer sets and/or entities comprised by said electrical producer arrangement. Further details of the electrical producer arrangement, such as location data (e.g. location data of the controllable consumer), technical details (e.g. max. power values), etc. can be stored in an assignment transaction agreement.

The data of an assignment transaction agreement and other data can be stored in the peer-to-peer application 324 and/or a storage arrangement 332 controlled by the peer-to-peer application 324. Preferably, the storage arrangement 332 comprising a plurality of decentral storage units 334 may be formed as a decentral file system (such as IPFS) or a decentral object store (such as storj) or a decentral distributed database (such as BigchainDB) controlled by the peer-to-peer application 324. For instance, details about all registered entities can be stored in the storage arrangement 332.

Figure 4:
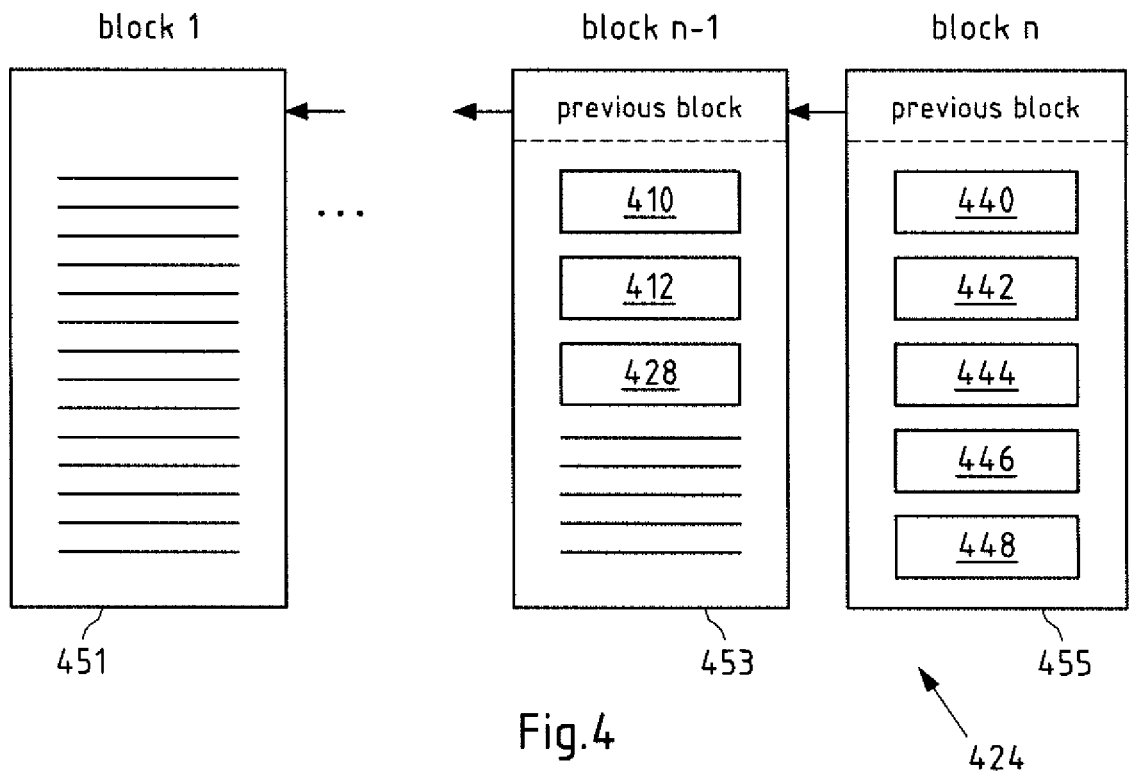
FIG. 4 shows an embodiment of a peer-to-peer application according to the present invention.

FIG. 4 shows a schematic view of an embodiment of a peer-to-peer application 424 according to the present application.

The depicted peer-to-peer application 424 is a register readable, in particular, by the participants of the peer-to-peer network. Thereby, data set(s) e.g. in form of messages can be written and/or read into/from the register 424 by a peer-to-peer module assigned to a controllable or non-controllable producer and/or any other participants in the peer-to-peer network. In a preferred embodiment, the peer-to-peer application 424 may be a block chain 424.

Hereinafter, it is assumed in the following description of the present embodiment that the at least one peer-to-peer application 424 is a block chain 424. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In further embodiments of the peer-to-peer application the block chain can be a permissionless or permissioned block chain. In a specific case the block chain can be public, consortium or private block chain.

In a further embodiment, the peer-to-peer application can be formed with multiple block chains which are connected via mechanisms such as side chains or smart contracts. Interoperability among block chains can be established.

The block chain 424 is formed by at least one block 451, 453, 455, preferably by a plurality of interconnected blocks 451, 453, 455. The first block 451 may also be called genesis block 451. As can be seen, a block 453, 455 (except for the first block 451) refers to each previous block 451, 453. A new block can be created by a computationally intensive process (for example, so called "mining" or through another appropriate process, such as voting) and will be particularly provided to all participants of the peer-to-peer network.

The present block chain 424 is particularly adapted to receive messages, such as messages comprising forecasting data set(s) and/or control instruction data set(s), registering data, authentication result(s), etc., from a peer-to-peer module of a previously described controllable or non-controllable producer, (off-chain) computing entity or from another peer-to-peer device/unit of another participant of the peer-to-peer network. Further, the block chain 424 is particularly adapted to save these messages in the block chain 424. Furthermore, the block chain 424 is configured to generate messages e.g. based on a controlling process/action, a forecasting process and/or caused by a peer-to-peer module and/or the execution of code of e.g. a controlling means 412, a first forecasting means 410, a second forecasting means 428, etc. In particular, the block chain 424 is at least configured to control and manage an electrical producer arrangement, such as shown in FIG. 1, 2 or 3.

In particular, a (newly) received message can be saved and published in the current block 455 of the block chain 424. Due to the configuration of a block chain 424 as a public register 424, said data message of e.g. a peer-to-peer module can be read by preferably all participants of the peer-to-peer network. Alternatively or additionally, data of a message may be stored on a decentral file service or distributed block chain database controlled by the block chain 424.

As already described, in the present block chain 424 different types of messages and data sets, respectively, for example, within a smart contract (algorithm and/or storage at the block chain 424) can be processed and/or stored. In the present example, the block chain 424 comprises a controlling means 412 in form of a smart contract 412. As previously described the controlling means 412 may be configured to at least control at least one controlling process comprising controlling the output of electrical power from at least one controllable producer of an electrical producer arrangement.

Furthermore, in the block chain 424 one or more assignment transaction agreement(s) 440 may be stored. An assignment transaction agreement 440 may be generated between at least one controllable producer and one or more non-controllable producers in order to (fixedly) assign said one or more non-controllable producer(s) to said at least one controllable producer. An example of a generation of such an assignment transaction agreement 440 will be described in the following:

An assignment transaction agreement 440 may comprise at least one of the following data:

Identifier(s): One or more identifier(s) of the involved entities/producers, such as controllable producer identifier(s), non-controllable producer identifier identifier(s), consumer set identifier(s), entity identifier(s) comprising a non-controllable producer and/or consumer set, electrical producer arrangement identifier, etc.

Assignment transaction criterion(s): Criterion(s) that must be fulfilled for allowing an assignment of a non-controllable producer to a controllable producer Operating detail(s): Detail(s) about controlling and/or forecasting process(es) (e.g. controlling and/or forecasting algorithm(s), registering rule(s)), performance parameter(s)

The assignment transaction criterion may be a predefined and maximum allowable distance between a controllable producer and a non-controllable producer. For instance, based on the respective location data (e.g. GPS data) of the controllable producer and the non-controllable producer, it can be checked whether the assignment transaction criterion in form of the predefined distance is fulfilled.

Another assignment transaction criterion may be e.g. an amount of cryptocurrency for an assignment for a future time period (e.g. x year(s) or an annual surplus of an energy amount consumed or produced by an entity. It may be possible that the amount has to be transferred prior to, during and/or after the respective process (including assignment process, controlling process, accounting process, etc.).

Preferably, the peer-to-peer application can provide an annual storage 448 e.g. for each involved entity (comprising at least a non-controllable producer). Based on measurement of the actual consumed and/or produced energy amount by an entity comprising a non-controllable producer and/or a consumer set, production and/or consumption fluctuations can be stored in the annual storage. E.g. periodically (for instance once a year) the annual storage 448 can be accounted e.g. by transferring an amount of cryptocurrency from an account of the entity to an account of the controllable producer (or vice versa) depending on the surplus of consumed or produced energy amount. It shall be understood that the time period (annual) of the storage 448 can be arbitrarily chosen. In particular, the wording "annual" does not require that it runs 365 days.

Preferably, at least a part of the said amount of cryptocurrency can be locked by the peer-to-peer application 424 prior to an assignment action. In an embodiment the assignment transaction criterion may be a payment channel for streaming small amounts of crypto tokens per each time and/or data unit. It shall be understood that other transaction criteria and further information can be included in an assignment transaction agreement. More information/criteria can be, for example, a time stamp, an ID of the transaction and the like.

In order to generate an assignment transaction agreement 440, a peer-to-peer module of a non-controllable producer, e.g. the peer-to-peer module of the entity comprising said non-controllable producer, and a peer-to-peer module of a controllable producer of can exchange request and response (acceptance) messages via the peer-to-peer application 424. A request message 442 may comprise indications about the above data (identifications, transaction criteria).

For instance, a the peer-to-peer module of the entity comprising said non-controllable producer can send by a peer-to-peer module a request message 442 to the peer-to-peer application 424 comprising data, such as an identifier assigned to the entity, non-controllable producer and/or a consumer set, location data of the entity (e.g. geographic coordinates), performance parameter(s) of the non-controllable producer and/or the consumer set, controlling and/or forecasting algorithm(s) and/or a further assignment transaction criterion.

Another message 444 may be an acceptance message 444 of e.g. a controllable producer. An acceptance message 444 may comprise identical or at least similar data details as compared with a (offer) message 444. Additionally, the acceptance message 444 can comprise a reference indication to a previous message, such as the ID of the message 444. The acceptance message 444 can be provided by a first peer-to-peer module of a controllable producer or by the peer-to-peer application (e.g. according to preset rules). A part of the nodes of the peer-to-peer network may previously check whether the predefined assignment transaction agreement, such as a predefined distance, is fulfilled by executing the peer-to-peer application.

If, for example, the acceptance message 444 comprises a higher or other further transaction criterion and/or other desired controlling/forecasting algorithm(s), the acceptance message 444 can be called a counter-offer message. This can be accepted by the peer-to-peer module of the entity through an acceptance message. Based on this a peer-to-peer module of an entity and/or controllable producer may cause the generation of an assignment transaction agreement 440. For instance, the assignment transaction agreement 440 can be used for every controlling and/or forecasting process of the grouped entities (comprising non-controllable producer(s) and/or consumer set(s)) and controllable producer(s).

In particular, there can be multiple request messages and/or accepting messages. Each entity and controllable producer can give guidelines, according to which at least one assignment transaction agreement 440 or other agreements can be generated. In a preferably automated, such as iterative process, each request/offer message can be associated to an optimally corresponding acceptance message. The block chain 424 may be configured to generate, based on the messages of a peer-to-peer module, an assignment transaction agreement 440.

Further, the controlling means 412 may be configured to control the at least one controllable producer (defined in the assignment transaction agreement 440) based on the assignment transaction agreement 440. The controlling means 412 may be executed by at least part of the nodes of the peer-to-peer network for conducting the controlling action. For instance, based on provided second and/or third energy amount(s) and e.g. performance parameters, the peer-to-peer application 424, in particular, the controlling means 412 may control the production of a first energy amount by the at least one controllable producer. In a similar manner, a first and/or a second forecasting means 410, 428 can be executed and controlled.

Moreover, a block chain 424 may comprise a registration means 446 configured to register a (new) entity, non-controllable producer, consumer set, controllable producer, user, etc. in the block chain 424 as a smart asset.

Figure 5:
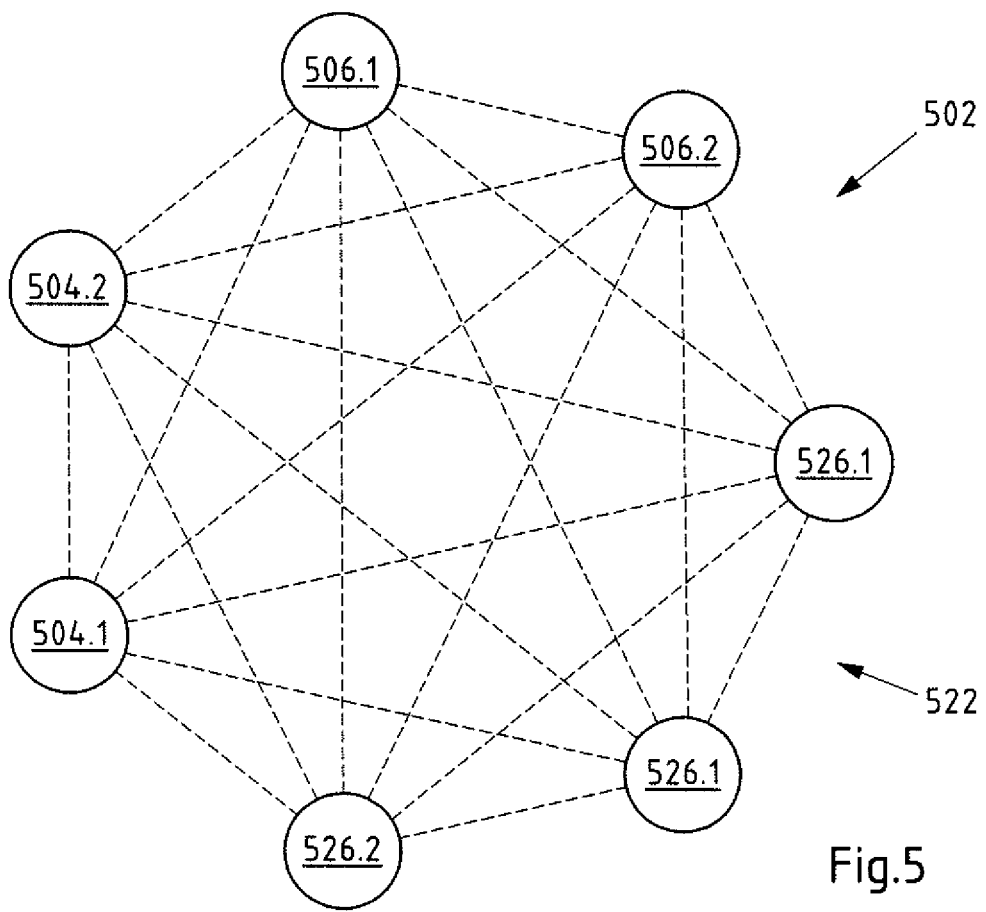
FIG. 5 shows a schematic view of a further embodiment of a system according to the present invention.

FIG. 5 shows a schematic view of another embodiment of a system 502 of the present application. In the present embodiment only nodes and participants 504.1, 504.2, 506.1, 506.2, 526.1, 526.2 of the peer-to-peer network 522 are shown. In the present example, it is assumed that all nodes participants 504.1, 504.2, 506.1, 506.2, 526.1, 526.2 comprise the peer-to-peer application (not shown).

The nodes 504.1, 504.2 may correspond to controllable producers and e.g. be formed by the respective peer-to-peer modules of controllable producers. The nodes 506.1, 506.2 may correspond to non-controllable producers and e.g. be formed by the respective peer-to-peer modules of non-controllable producers. Nodes 526.1 and 526.2 may be other nodes. It shall be understood that nodes can be full, remote or light nodes.

As can be seen, two different types of peers or node computers 504.1, 504.2, 506.1, 506.2, 526.1, 526.2 are presently illustrated. All 504.1, 504.2, 506.1, 506.2, 526.1, 526.2 are comprised by the peer-to-peer network 522. In the present embodiment, however, only a part of the peers 504.1, 504.2, 506.1, 506.2, 526.1, 526.2 in the present case, the peers (nodes) 504.1, 506.1, 526.1 check the validity of e.g. a controlling and/or forecasting and/or further data stored in the peer-to-peer application, such as agreements, control instruction data set, and the like.

Furthermore, only a part of the entire peers can be configured to store the peer-to-peer application and/or only a part of the peers can be configured to execute the algorithms of a smart/private contract. Since the validation/verification of e.g. identification data requires a considerable computational effort, it may be advantageous for reasons of efficiency, if only a part of the peers 504.1, 506.1, 526.1, especially particularly powerful peers 504.1, 506.1, 526.1, perform the validation and/or controlling and/or forecasting algorithms.

Validation, analytics and optimization can be done on-chain or off-chain, as described hereinbefore. Off-chain validation and/or optimization can be managed by the peer-to-peer application, like the code on the block chain. Powerful means in particular a high computing power. In other words, in the present case a valid entry in the peer-to-peer application, such as a block chain, is assumed if (only) a part of the peers 504.1, 506.1, 526.1 comes to a positive result. It shall be understood that only a single, especially particularly powerful peer can perform the validation, analytics and/or optimization process.

Similarly, in an alternative (not shown) embodiment, a particularly large peer-to-peer network may be divided in two or more clusters. In a corresponding peer-to-peer network, for example, a validation will only be carried out by the members of one cluster (e.g. sharding of a block chain to improve the scalability). In a further embodiment the peer-to-peer application can be formed using multiple block chains. These block chains are connected via frameworks such as sidechains or smart contracts or interlegder.

Figure 6:
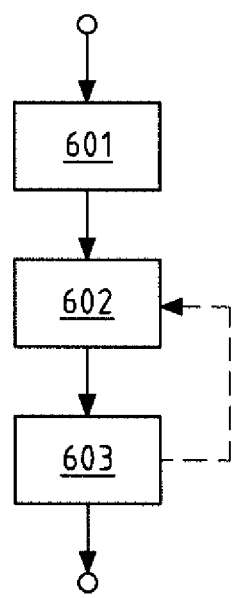
FIG. 6 shows an embodiment of a method according to the present invention.

FIG. 6 shows an embodiment of a method according to the present invention. The method can be used for operating a previously described system.

In a first step 601, an electrical producer arrangement can be formed. In particular, at least one non-controllable producer can be assigned to a controllable producer. The assignment process can be managed and controlled by the peer-to-peer application. For instance, the peer-to-peer application can generate an assignment transaction agreement about the assignment of at least one non-controllable producer to at least one controllable producer, and thus, about the formation of a (virtual) electrical producer arrangement. The assignment transaction agreement can be generated, as previously described. Thereby, the formation of an electrical producer arrangement also includes the extension of an electrical producer arrangement by assigning a further entity, non-controllable producer, controllable producer and/or consumer set to an already existing electrical producer. It shall be understood that also the reduction of an electrical producer arrangement e.g. by removing (de-assignment) an entity, non-controllable producer, controllable producer and/or consumer set from an electrical producer arrangement can be conducted in step 601.

Prior to the generating forming the electrical producer arrangement, the peer-to-peer network can check the identifier of the requesting entity by using e.g. the identifier list with identifiers of authorized producers, entities, etc.

Upon the formation of an electrical producer arrangement, said electrical producer arrangement and the system can be operated in steps 602 and 603. The step 602 may be a forecasting step 602 and step 603 may be a controlling step 603 based on the forecasting result(s) of the forecasting step 602.

For instance, at least one first forecasting means may be configured to forecast a second energy amount to be produced during a predefinable future time period by at least one non-controllable producer of an electrical producer arrangement. As described hereinbefore, the first forecasting means may evaluate historical production data, performance parameter(s), weather forecast data, user instructions, etc. in order to (accurately) forecast the at least one second energy amount.

In an equivalent manner, at least one second forecasting means can forecast a third energy amount to be consumed during said predefinable future time period by at least one consumer set of an electrical producer arrangement. Preferably, respective energy amounts can be forecasted for all non-controllable producer(s) and all consumer set(s) of said electrical producer arrangement. Based on the individual forecasted second and third energy amounts a total (forecasted) energy amount to be supplied by the sum of non-controllable producers and consumer sets, in particular, one or more corresponding entities, during said predefinable future time period can be determined.

Then, in step 603 based on the at least one forecasted second energy amount, in particular, based on said total forecasted energy amount, the controlling means may control the at least one controllable producer such that total energy amount supplied by the electrical producer arrangement to the electrical network corresponds to a predefinable total energy amount. For instance, the difference between the total forecasted energy amount and the predefinable total energy amount can be determined and the controllable producer(s) of said electrical producer arrangement can be controlled such that the controllable producer(s) produces and supplies said determined difference. Preferably, at least one control instruction data set can be provided by the controlling means to the at least one first peer-to-peer module assigned to the controllable producer.

It shall be understood that all steps 601, 602 and 603 can be at least partly performed in parallel to each other. For instance, during steps 602 and 603, the electrical producer arrangement can be extended. Further, it is also possible that during a controlling process (603), the forecasting process for e.g. a next future time period can be forecasted.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system, comprising:
   at least one controllable producer configured to produce at least one first energy amount depending on a controllable inflow of a source medium;
   at least one non-controllable producer configured to produce at least one second energy amount depending on a non-controllable inflow of a source medium;
   wherein the non-controllable producer is assigned to the controllable producer to form an electrical producer arrangement;
   at least one first forecasting means configured to forecast the at least one second energy amount to be produced by the non-controllable producer during at least one future time period; and
   at least one controlling means configured to control the controllable producer based on the at least one forecasted second energy amount such that total energy amount supplied by the electrical producer arrangement to an electrical network during the future time period corresponds to a predefinable total energy amount;
   wherein the system comprises a peer-to-peer network comprising at least one peer-to-peer application,
   wherein the at least one peer-to-peer application is executable by at least two nodes of the peer-to-peer network;
   wherein the peer-to-peer application is a decentralized register configured to store data and computer code acting as at least one of the controlling means or first forecasting means;
   wherein the peer-to-peer application is configured to form an electrical producer arrangement by generating an assignment transaction agreement at least about the assignment of the non-controllable producer to the controllable producer; and
   wherein the at least two nodes of the peer-to-peer network are configured, after the generation of the assignment transaction agreement, to store the agreement.

2. The system according to claim 1, wherein the electrical producer arrangement comprises at least one second forecasting means configured to forecast at least one third energy amount to be consumed by at least one consumer set of the electrical arrangement during the future time period;
   wherein the controlling means is configured to control the controllable producer based on the at least one forecasted second energy amount and the at least one forecasted third energy amount such that total energy amount supplied by the electrical producer arrangement to the electrical network during the future time period corresponds to the predefinable total energy amount.

3. The system according to claim 1, wherein the assignment of the at least one non-controllable producer to the at least one controllable producer depends at least on the distance between the non-controllable producer and the controllable producer.

4. The system according to claim 3, wherein a non-controllable producer is only assignable to the controllable producer if the distance between the non-controllable producer and the controllable producer is below at least one predefined distance threshold;
   wherein the predefined distance threshold is preferably 50 km, in particular preferably 10 km.

5. The system according to claim to claim 1, wherein the peer-to-peer application comprises at least the second forecasting means.

6. The system according to claim to claim 5, wherein the peer-to-peer application comprises at least one registration means configured to receive a registering message of a peer-to-peer module assigned to at least one element of the group comprising the non-controllable producer, the controllable producer and the consumer set, entity comprising at least one of the non-controllable producer or the consumer set;
   wherein the registration means is configured to register the element by storing a unique identifier of the element in at least one of the peer-to-peer application or a storage arrangement controlled by the peer-to-peer application.

7. The system according to claim to claim 1, wherein the electrical producer arrangement comprises at least one first peer-to-peer module assigned to the controllable producer;
   wherein the controlling means is configured to control the controllable producer by providing at least one control instruction data set to the first peer-to-peer module assigned to the controllable producer.

8. The system according to claim to claim 1, wherein the electrical producer arrangement comprises at least one further peer-to-peer module assigned to the non- controllable producer;
   wherein the further peer-to-peer module is configured to provide at least one data set to the peer-to-peer application; and
   wherein the data set comprises at least one of:
      the forecasted second energy amount,
      at least one local meteorological parameter, and
      at least one performance parameter regarding the performance of the non- controllable producer.

9. The system according to claim to claim 1, wherein the electrical producer arrangement comprises at least one further peer-to-peer module assigned to the consumer set;
   wherein the further peer-to-peer module is configured to provide at least one data set to the peer-to-peer application; and
   wherein the data set comprises at least one of:
      the forecasted third energy amount,
      actual third energy amount, and at least one performance parameter regarding the performance of the consumer set.

10. The system according to claim to claim 1, wherein the generated assignment transaction agreement comprises at least one of:
identifiers of the involved non-controllable producer, controllable producer, or both,
at least one performance parameter regarding the performance of the non- controllable producer,
at least one performance parameter regarding the performance of the controllable producer, and
at least one assignment transaction criterion.

11. The system according to claim to claim 1, wherein the at least one peer-to-peer application is a block chain or decentral ledger comprising at least two blocks coupled to each other.

12. A method for operating a system, in particular, a system according to claim 1, wherein the system comprises at least one the electrical producer arrangement with at least one non-controllable producer configured to produce at least one second energy amount depending on a non-controllable inflow of a source medium that is assigned to at least one controllable producer configured to produce at least one first energy amount depending on a controllable inflow of a source medium, the method comprising:
forecasting at least one second energy amount to be produced by the non- controllable producer during a future time period by a first forecasting means, and
controlling the at least one controllable producer based on the at least one forecasted second energy amount by a controlling means such that a total energy amount supplied by the electrical producer arrangement to an electrical network during the future time period corresponds to a predefinable total energy amount,
wherein the at least one peer-to-peer application is executed by at least two nodes of the peer-to-peer network,
wherein the peer-to-peer application is a decentralized register configured to store data and computer code acting as at least one of the controlling means and/or first forecasting means,
wherein the peer-to-peer application is configured to form an electrical producer arrangement by generating an assignment transaction agreement at least about the assignment of the non-controllable producer to the controllable producer, and
wherein the at least two nodes of the peer-to-peer network are configured, after the generation of the assignment transaction agreement, to store the agreement.

13. An electrical producer arrangement, comprising:
at least one non-controllable producer configured to produce at least one second energy amount depending on a non-controllable inflow of a source medium, the at least one non-controllable producer assigned to at least one controllable producer configured to produce at least one first energy amount depending on a controllable inflow of a source medium,
at least one first peer-to-peer module configured to communicate with at least one peer-to-peer application of at least one peer-to-peer network,
wherein the first peer-to-peer module is assigned to the controllable producer and configured to receive at least one control instruction data set based on at least one forecasted second energy amount to be produced by the non-controllable producer during a future time period,
wherein the controllable producer is controlled by the controlling means based on the received one control instruction data set such that a total energy amount supplied by the electrical producer arrangement to an electrical network during the future time period corresponds to a predefinable total energy amount,
wherein the at least one peer-to-peer application is executable by at least two nodes of the peer-to-peer network,
wherein the peer-to-peer application is a decentralized register configured to store data and computer code acting as at least one of the controlling means or first forecasting means,
wherein the peer-to-peer application is configured to form an electrical producer arrangement by generating an assignment transaction agreement at least about the assignment of the non-controllable producer to the controllable producer, and
wherein the at least two nodes of the peer-to-peer network are configured, after the generation of the assignment transaction agreement, to store the agreement.

14. A peer-to-peer application of a peer-to-peer network, comprising:
at least one controlling means configured to control at least one controllable producer configured to produce at least one first energy amount depending on a controllable inflow of a source medium that is assigned to at least one non- controllable producer configured to produce at least one second energy amount depending on a non-controllable inflow of a source medium based on at least one forecasted second energy amount to be produced by the non-controllable producer during a future time period such that total energy amount supplied by an electrical producer arrangement to the electrical network during the future time period corresponds to a predefinable total energy amount, wherein the electrical producer arrangement comprises the at least one non-controllable producer assigned to the at least one controllable producer,
wherein the peer-to-peer application is executable by at least two nodes of the peer-to-peer network,
wherein the peer-to-peer application is a decentralized register configured to store data and computer code acting as at least one of the controlling means or first forecasting means,
wherein the peer-to-peer application is configured to form an electrical producer arrangement by generating an assignment transaction agreement at least about the assignment of the non-controllable producer to the controllable producer, and
wherein the at least two nodes of the peer-to-peer network are configured, after the generation of the assignment transaction agreement, to store the agreement.

* * * * *